Inventor:
Franz Werner
by Karl F. Ross
AGENT

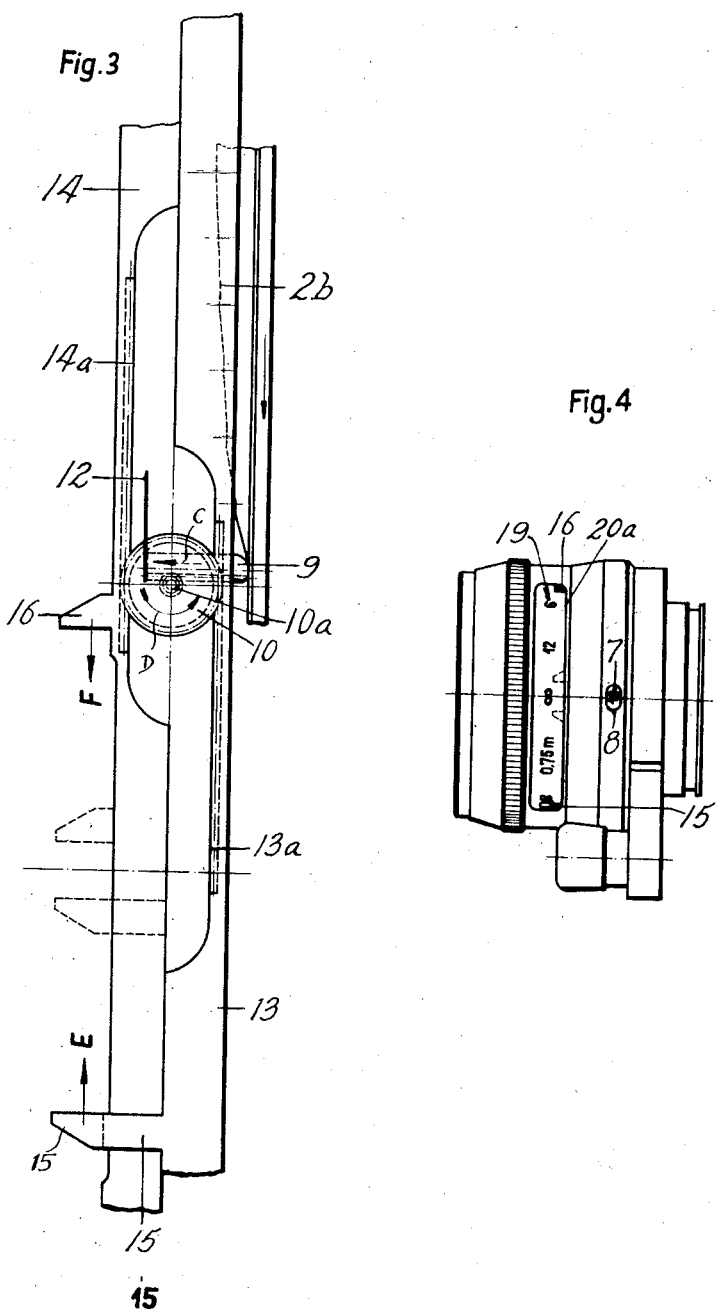

2,901,956

OPTICAL SYSTEM HAVING MEANS FOR INDICATING DEPTH OF FIELD

Franz Werner, Munster-Sarmsheim, Germany, assignor to Jos. Schneider & Co., Kreuznach, Rhineland, Germany, a firm Application August 10, 1953, Serial No. 373,326

Claims priority, application Germany October 14, 1952

2 Claims. (Cl. 95—64)

My present invention relates to mechanism for automatically indicating the depth of field in an optical system, such as the objective of a photographic camera, wherein a control member adapted to vary the spacing of a lens support from an image surface, preferably by means of screw threads, is provided with a scale or other suitable indicator means on which the instantaneous focusing distance may be read. The depth of field, as is well known, is that range of distances both ahead and back of the precise focusing distance throughout which satisfactory definition of the projected image is obtained. The extent of this range is determined, with a constant blur circle diameter, by the focal length and the aperture ratio of the objective; it is greater for objectives with shorter focal length and increases upon reduction of the relative aperture. Thus, in the case of a given focal length it is possible to vary the depth of field with the diaphragm aperture, it being of course desirable to have means for correlating each diaphragm stop with the corresponding field range.

Earlier arrangements designed to provide the desired depth-of-field indications include, for example, a special indicator ring bearing engravings or colored markings by means of which the focusing range corresponding to each diaphragm setting can be read on the adjacent scale of the distance indicator. This arrangement lacks the required accuracy in the case of objectives with long focus, where the limits of the focusing range are close together, and in those instances where the distance scale cannot be conveniently equipped with suitable reference lines.

The general object of this invention is to provide simple and automatically operating means for clearly indicating the depth of field on the distance scale of the objective whenever the diaphragm opening is adjusted to the value determined by the conditions of use. A more particular object of the invention is to provide indicator means, as set forth above, in the form of a pair of relatively movable pointers co-operating with the distance scale and, by their positions thereon, defining the variable limits of the focusing range.

A feature of my invention resides in the provision of a rotatable control member, centered on the optical axis of the system, which serves to adjust the diaphragm and is so coupled with a pair of indicator members as to cause movement of the latter in opposite directions under actuation of said control member, the relative spacing of the indicator members increasing with a reduction in the size of the diaphragm opening and vice versa.

The control member is preferably a cam provided with a pair of curves for actuating the range indicator and the diaphragm, respectively.

The above and other objects and features of this invention will become more fully apparent from the following description of a now preferred embodiment, reference being had to the accompanying drawing in which:

Fig. 3 shows the range indicating mechanism in developed form; and

Fig. 4 is a side elevation of the objective on a smaller scale.

Figure 1:
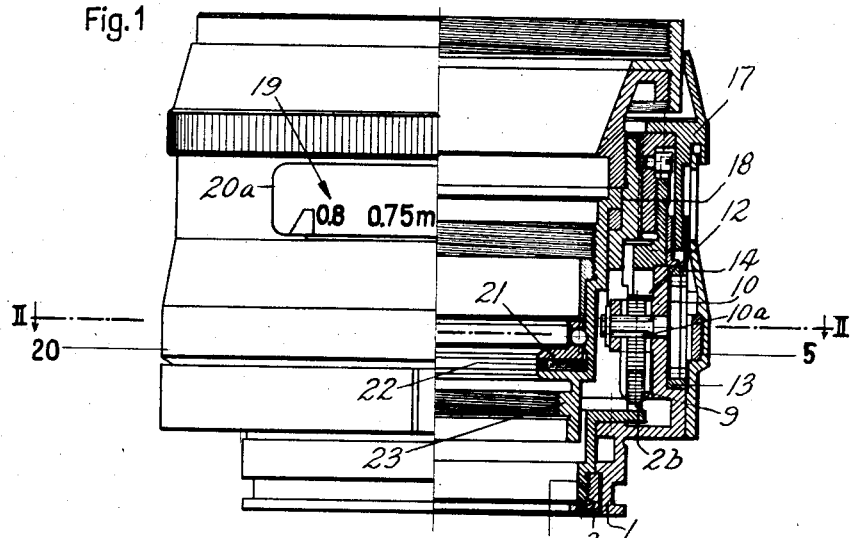
Fig. 1 shows an objective according to the invention partly in view and partly in axial section.

Referring to the drawing, there is shown at 1 a bayonet-type coupling member on which there is rotatably supported the control member 2; the latter takes the form of a contoured disk having a curved periphery 2a representing the diaphragm-setting cam and further having a shoulder extending in a rough helix around part of its periphery, this shoulder defining a curve 2b representing the cam for the actuation of the range indicator. Control member 2 is mounted in coupling member 1 by means of a ring 3 inserted in the latter and threadedly engaging the former.

The positioning of control member 2 is effected by means of an actuating ring 5 which is positively coupled with member 2 through a connecting pin 4 and carries a setting knob 6; ring 5 bears on its outer periphery the diaphragm scale 7 (Fig. 4) which is visible through a window 8 provided in a stationary sleeve 20 secured to the member 1. A rack 9, lodged in an extension of a coupling member 1 for movement in a direction parallel to the axis of the rotatable systems 2, 4, 5, co-acts with a pinion 10a which is rigid with a gear 10 and is rotatably mounted in said extension along with a retaining disk 11. A leaf spring 12, likewise secured to the fixed support 1, bears upon the upper end of rack 9 (as viewed in Fig. 1) to urge its lower end into contact with the curve 2b of control member 2.

A pair of indicator rings 13 and 14, whose countersunk gear teeth 13a, 14a engage the gear 10 on opposite sides, are rotatably held in support 1 concentric with disk 2 and carry the indicator elements or pointers 15 and 16, respectively. The setting ring for the focusing control, shown at 17, forms part of rotatable assembly threadedly engaging the focusing tube 18 which is rigid with the lens barrel 23 and is axially displaceable in support 1, in the well-known manner, by a rotation of ring 17; this arrangement is similar to the one shown in Fig. 1 of my co-pending application Ser. No. 373,314, now abandoned, filed on even date herewith. The distance scale 19, carried on ring 17, is visible through a window 20a in sleeve 20. The slotted diaphragm control ring 21, mounted for ready rotation in the lens barrel 23 by means of ball bearings as shown, controls the position of the iris leaves 22 of the diaphragm in a manner well known per se.

While the coupling between control member 2 and diaphragm control ring 21 has not been illustrated, it may be mentioned by way of example that the same may take the form disclosed in my aforesaid co-pending application Ser. No. 373,314, in which the contour 2a of disk 2 acts upon a pivoted arm serving as a means for preselecting the desired operating aperture of the diaphragm; it may also be noted that the contour 2a (or an equivalent groove in disk 2) may act upon a diaphragm-setting lever arm in substantially the manner disclosed in my co-pending application Ser. No. 373,327, now Patent No. 2,803,182, likewise filed on even date herewith. The transfer of power to ring 21 may take place in either instance by way of one of the iris leaves 22 acting as a lever, as indicated in dotted lines in Fig. 2.

Figure 2:
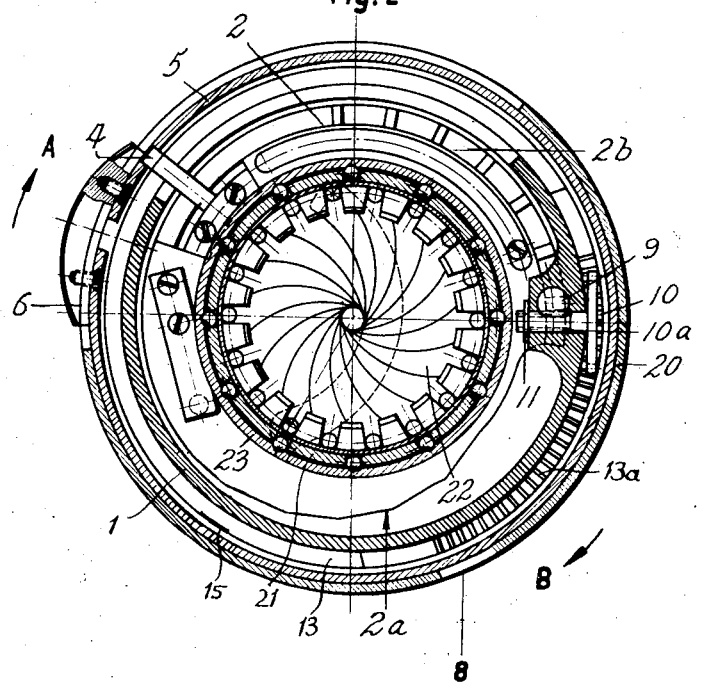
Fig. 2 is a cross-section on the line II—II of Fig. 1.

The operation of the herein described embodiment of my invention is as follows:

When the setting knob 6 is rotated, say, clockwise (direction of arrow A) as viewed in Fig. 2, ring 5 turns until the desired marking of its diaphragm scale 7 appears in the window 8. Cam disk 2 rotates in the same sense (arrow B) and with its curve 2b acts upon the rack 9, causing the latter to move to the left (Fig. 3) against the force of spring 12 (arrow C). Pinion 10a, meshing with the rack 9, rotates the gear 10 counterclockwise (arrow D), this gear causing the two indicator rings 13 and 14 to rotate in opposite directions (arrows E and F, respectively) in planes perpendicular to the optical axis of the system; an alternative position thus capable of being reached by the pointers 15 and 16 has been illustrated in dotted lines in Figs. 3 and 4. Since the ends of the pointers are visible through window 20a, the depth of field defined thereby may be read directly on the scale 19 which, in turn, is independently adjustable to the desired focusing distance by means of setting ring 17.

It will be noted that the system according to my invention operates positively and automatically to give the desired range indication once the diaphragm setting and the focusing distance have been selected, the resulting indication being easily evaluated with the aid of a conventional distance scale. It will also be seen that the invention can be embodied in a very compact, simple and conveniently manipulable arrangement.

The invention is, of course, not limited to the specific embodiment described and illustrated, various modifications and adaptations thereof being possible within the spirit and scope of the appended claims.

I claim:
1. In a photographic camera objective, in combination, a support, an axially displaceable lens carrier on said support, a diaphragm on said support having an adjustable aperture, control means for varying the aperture of said diaphragm including a disk coaxial with said diaphragm and rotatable on said support around the optical axis of said lens carrier, said disk having a cam-shaped peripheral ridge, a rack mounted on said support with freedom of movement in a direction substantially parallel to said axis, spring means urging said rack into contact with said ridge whereby said rack is displaceable in said direction under the control of said ridge upon rotation of said disk, a focusing ring bearing a distance scale, said focusing ring being centered on said axis and rotatably mounted on said support in operative engagement with said lens carrier for axially displacing the latter, a pair of toothed indicator rings mounted on said support for rotation about said axis, a pair of depth-of-focus markers respectively carried on said indicator rings and positioned for co-operation with said distance scale, a pinion in mesh with said rack, and a single gear positively coupled with said pinion and engaging said toothed indicator rings for translating unidirectional movement of said rack into relatively opposite movements of said markers across said scale.

2. The combination according to claim 1, wherein said ridge extends along only a portion of the periphery of said disk, another portion of said periphery being contoured in its plane of rotation and forming a cam controlling the aperture of said diaphragm.

References Cited in the file of this patent

UNITED STATES PATENTS

| 871,654 | Watkins et al. | Nov. 19, 1907 |
| 2,342,819 | Priesemann | Feb. 29, 1944 |
| 2,350,009 | Babcock et al. | May 30, 1944 |
| 2,527,106 | Smith | Oct. 24, 1950 |

FOREIGN PATENTS

| 139,562 | Austria | Nov. 26, 1934 |